(No Model.)
T. J. PALMER.
MANUFACTURE OF MATERIALS FOR COVERING WALLS OR OTHER SURFACES.
No. 406,464. Patented July 9, 1889.
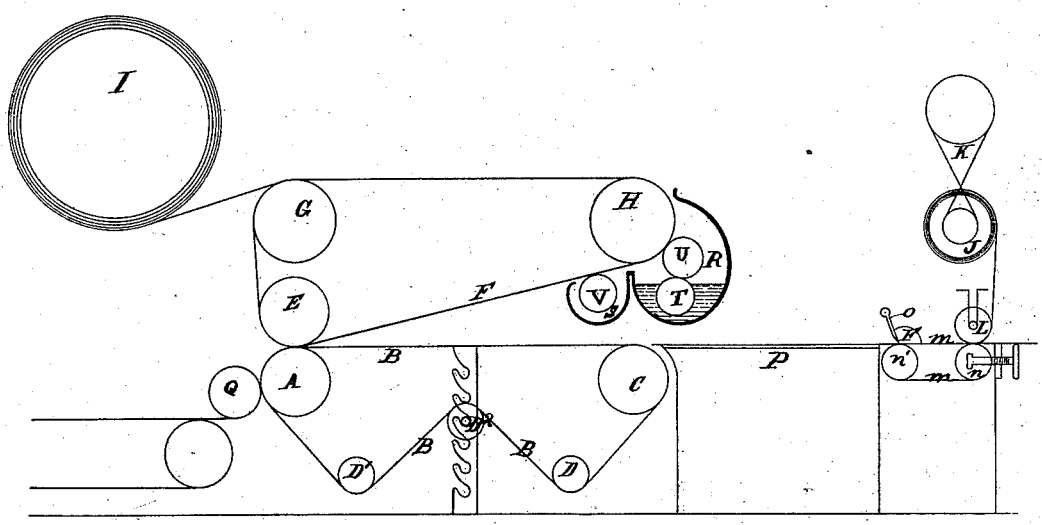
WITNESSES:
Philip Mauro
C. J. Hedrick
INVENTOR:
Thomas John Palmer
by A. Pollok
his attorney

UNITED STATES PATENT OFFICE.

THOMAS JOHN PALMER, OF LANCASTER, ENGLAND.

MANUFACTURE OF MATERIAL FOR COVERING WALLS OR OTHER SURFACES.

SPECIFICATION forming part of Letters Patent No. 406,464, dated July 9, 1889.

Application filed May 21, 1888. Serial No. 274,555. (No model.) Patented in England May 2, 1888, No. 6,554.

*To all whom it may concern:*

Be it known that I, THOMAS JOHN PALMER, decorative material manufacturer, a subject of the Queen of Great Britain, and residing at Queen's Mill, Lancaster, in the county of Lancaster, England, have invented certain improvements in the Manufacture of Embossed Materials for Decorative or other Purposes, (for which I have obtained a patent in Great Britain, No. 6,554, dated May 2, 1888,) of which the following is a specification.

The present invention relates to the manufacture of an embossed material for decorative or other purposes, which material is composed of a web (such as paper) forming a foundation and a surface layer or facing, which may be metal in strips or pieces, or other material decorated or printed with a design which registers with an embossed or molded design on the foundation-web.

The invention consists in a process for producing such material in continuous lengths, as hereinafter described and claimed.

In carrying out the invention a web of embossed foundation material of suitable thickness is fed continuously through a pair of rollers, one of which is, and both of which may be, covered with a soft or yielding material, such as a pile fabric. The facing material (in the form of a continuous web or of overlapping pieces) is fed simultaneously to the same rollers where the two webs meet and are joined together, a suitable cement having been applied to one or the other of these materials as they approach the rollers. An endless band of elastic or yielding material passes, with the two sheets to be united, between the aforesaid rollers and assists in causing the facing to be pressed into all the depressions of the foundation material and to follow exactly the surface of the latter. Where the ornamental facing is of metal sufficiently stout to admit of handling without injury, the cement is preferably applied to it, and in that case the metal strips or sheets, after receiving the adhesive coating, are passed over a heated surface prior to being brought into contact with the foundation material.

The process may be carried out with any suitable apparatus; but in order that the same may be clearly understood I will describe how the invention may be practiced, reference being had to the accompanying drawing, which illustrates diagrammatically apparatus suitable for the purpose.

A represents a roller whose surface is preferably covered with a yielding material, as pile fabric, rubber, felt, or the like, and B represents an endless belt of rubber, felt, or other elastic or yielding material, which passes over roller A and also over rollers C D D' $D^2$, the latter being a tension-roller, whose position in its supporting-rack can be changed as desired to regulate the tension of the band B. For patterns of high relief the band is preferably bound at the edges with inelastic material, such as metal ribbon, so that the middle portion of the band may give more freely. For patterns of low relief it is preferred not to bind the edges of the band. Roller E is adapted to make contact with roller A, and an endless band F passes around said roller E and around rollers G and H. Band F, if used for patterns with a hollow back, may be similar to band B, but not necessarily so thick.

I represents a roller holding the embossed foundation material, which is fed face downward on band F and carried by the latter around roller H and between rollers A E, the leading end of the material being attached to said band by suitable clips. The facing material is placed on a roller J. If it be of sheet metal sufficiently strong for free handling, the sheets or leaves are lapped at their meeting edges and joined by a suitable cement into a continuous length.

With roller J is combined a tension-pulley K and friction-strap for keeping a proper tension on the facing material, and below roller K is another roller L in free bearings, said roller having preferably a smooth face, say of metal or rubber. The facing material is brought under this roller and is fed along by a rubber band $m$, which is stretched around rollers $n$ $n'$, the bearings of the former being adjustable.

When the adhesive material is to be applied to the facing, the doctor-blade $o$, above band $m$ and roller $n'$, is brought into use. Said blade is provided with side pieces F, between which and against said blade is laid the cementing solution, which should be of a fairly stiff consistency. It will be kept up against blade *o* by the continued motion of band *m*. The thickness of the layer of cementing solution may be regulated by adjusting blade *o* to the proper distance above band *m*. Where the facing material consists of overlapped pieces, as above described, it should be brought onto band *m* in such manner that the overlapped piece does not meet the doctor-blade end on. The elasticity of band *m* will permit the double thickness of material at the joints to pass the blade without injury. After the web coated with adhesive substance passes blade *o* it comes in contact with a table P, heated by steam or otherwise, the object being to evaporate quickly the spirit from the cementing solution and render it more "tacky" or adhesive. The web is then carried along by band B, which brings it in contact with the front face of the foundation material at the nip between rollers A and E, which press the pliable facing material well into the concavities of the embossed or molded fabric and bring the two surfaces into contact practically at all points, the elastic band B co-operating in effecting this result, as already explained. With a view to make the result more sure it is desirable to keep the combined material in contact with band B and pass it between rollers A and Q, the surface of the latter being also covered with elastic material.

With some fabrics, particularly when very thin metal leaf is employed as the facing material, it is best to apply the cementing solution to the foundation material. In this case, for convenience in handling, the thin metal leaf or foil should be spread upon a sheet of thin paper or cloth with the meeting edges slightly overlapping, and then carefully rolled on a suitable roller.

The troughs R S are arranged as shown in the drawing, and the former contains a suitable cementing-fluid in which revolves a roller T. A brush-roller U makes contact with this roller and applies the cement to the surface of the foundation material as it passes over roller H. Brush U should rotate in the same direction as that of the fabric, but at a much higher speed, and it may have a quick lateral motion also. Roller V rotates in trough S, (which may also contain a cementing solution,) its motion being in the opposite direction to that of roller U, the chief object of roller V being to level and equalize the coating of cement. The fabric after passing roller V proceeds to rollers A E, as already described.

When a facing having a pattern printed thereon is used, care must be taken to keep its pattern in register with that of the foundation fabric or material.

The cement used may be of any suitable sort. The following is found to answer well, viz: one pound of shellac and two pounds of good rosin dissolved with methylated spirit, a sufficient quantity being added to bring it to the required consistency.

Having now explained the principle of my said invention and the manner in which the same is or may be carried into effect, what I claim is—

1. The process of uniting an embossed foundation fabric or material and an ornamental facing, which process consists in spreading a layer of cement on one of said materials and passing both between rollers, together with a band of elastic or yielding material, substantially as described.

2. The process of uniting an embossed foundation fabric with an ornamental facing of metal, which process consists in spreading upon the metal sheets or strips a layer of cement, heating it and passing it, together with the foundation material and an elastic band, between rollers, whereby a yielding pressure is brought to bear on the two materials and the metal facing made to conform to the surface of the foundation fabric, substantially as described.

In testimony whereof I have signed my name to this specification in the presence of two subscribing witnesses.

THOMAS JOHN PALMER.

Witnesses:
  WM. SWAINSON,
    *Solicitor, Lancaster.*
  W. O. ROPER,
    *Solicitor and Notary Public.*